(12) United States Patent
Olson

(10) Patent No.: US 8,145,215 B2
(45) Date of Patent: Mar. 27, 2012

(54) SCANNING FOR A WIRELESS DEVICE

(75) Inventor: Timothy S. Olson, San Jose, CA (US)

(73) Assignee: ShoreTel, Inc., Sunnyvale, CA (US)

(*) Notice: Subject to any disclaimer, the term of this patent is extended or adjusted under 35 U.S.C. 154(b) by 1124 days.

(21) Appl. No.: 11/965,518

(22) Filed: Dec. 27, 2007

(65) Prior Publication Data
US 2009/0170501 A1 Jul. 2, 2009

(51) Int. Cl.
H04W 4/00 (2009.01)

(52) U.S. Cl. .......... 455/434; 455/166.2; 455/179.1; 455/435.2; 370/328; 370/338

(58) Field of Classification Search .......... 455/63.3, 455/423, 425, 440, 452.2, 450, 552.1; 370/311, 370/328, 331, 337, 338
See application file for complete search history.

(56) References Cited

U.S. PATENT DOCUMENTS

| 7,286,515 | B2* | 10/2007 | Olson et al. ............ 370/338 |
| 2003/0134633 | A1* | 7/2003 | Reid ...................... 455/423 |
| 2005/0209858 | A1* | 9/2005 | Zak ........................ 704/275 |
| 2006/0018292 | A1* | 1/2006 | Wiatrowski et al. ...... 370/337 |
| 2006/0025151 | A1 | 2/2006 | Karaoguz et al. |
| 2006/0159041 | A1* | 7/2006 | Zhun ...................... 370/328 |
| 2006/0203789 | A1 | 9/2006 | Iacono et al. |
| 2006/0287003 | A1 | 12/2006 | Moinzadeh et al. |
| 2007/0072610 | A1 | 3/2007 | Qiao et al. |
| 2007/0091845 | A1* | 4/2007 | Brideglall ................ 370/331 |
| 2008/0027306 | A1* | 1/2008 | Washburn et al. ......... 600/410 |

OTHER PUBLICATIONS

Haitao Wu et al., "Proactive Scan: Fast Handoff with Smart Triggers for 802.11 Wireless LAN", IEEE INFOCOM 2007 (May 2007).
PCT International Search Report mailed Feb. 6, 2009, Agito Networks, Inc.
PCT Written Opinion of the International Searching Authority, Feb. 6, 2009, Agito Networks, Inc.

* cited by examiner

Primary Examiner — Dwayne Bost
Assistant Examiner — Inder Mehra
(74) Attorney, Agent, or Firm — Tarolli, Sundheim, Covell & Tummino LLP

(57) ABSTRACT

A system and method are disclosed to achieve improvements in scanning that can be implemented by a wireless device. A method to control scanning performed by a mobile unit includes detecting the presence or absence of audio for transmission from the mobile unit. A performance of a scan can be deferred depending on the detection of the presence or absence of audio.

18 Claims, 3 Drawing Sheets

SCANNING FOR A WIRELESS DEVICE

TECHNICAL FIELD

The present invention relates generally to communications and, more particularly, to a system and method to control scanning by mobile device.

BACKGROUND

Various types of wireless technologies have been developed for communication of voice, data and a combination of voice and data. Many wireless devices are being manufactured to enable operability in more than one type of technology. For example, portable electronic devices, such as cellular telephones and personal digital assistants, can include interfaces that enable operation using cellular technologies, wireless local area network (WLAN) technologies, and/or Bluetooth technologies to name a few.

As a further example, many enterprise networks support voice over internet protocol (VoIP) that can run over one or more wireless networks. For instance, WiFi voice networks currently support VoIP and, with little integration, with a wider area voice network, such as cellular networks. Dual mode phones, which have both an 802.11 interface and a cellular interface, are increasingly being utilized. However, it tends to be difficult to implement seamless roaming in 802.11 networks without degradation in overall voice quality, such as in the form of gaps or delays in the voice being transmitted.

SUMMARY

The invention relates generally to a system and method to improvements in scanning that can be implemented in a wireless device. As a further example, the invention can be utilized to synchronize scanning with periods of voice silence to mitigate degradation of voice audio during a call session (e.g., a VoIP call session). Additionally, the scanning control can be utilized in the context of a mobile unit that implements scanning for any of a variety of reasons.

One aspect of the invention provides a method to control scanning performed by a mobile unit. The method includes detecting the presence or absence of audio for transmission from the mobile unit and deferring performance of a scan depending on the detection of the presence or absence of audio.

Another aspect of the invention provides a system to control scanning by a mobile unit. The system includes a scan control component programmed to synchronize a scan control request for performing scanning by a wireless transceiver of the mobile unit with periods of voice silence during a call session of the mobile unit.

Yet another aspect of the invention provides a mobile unit. The mobile unit includes a first wireless transceiver configured to communicate using a first radio technology and a second wireless transceiver configured to communicate using a second radio technology, which is different from the first radio technology. A scan control component is programmed to synchronize scanning performed by the first wireless transceiver with periods of voice silence during a call session implemented by the mobile unit.

DETAILED DESCRIPTION

Figure 1:
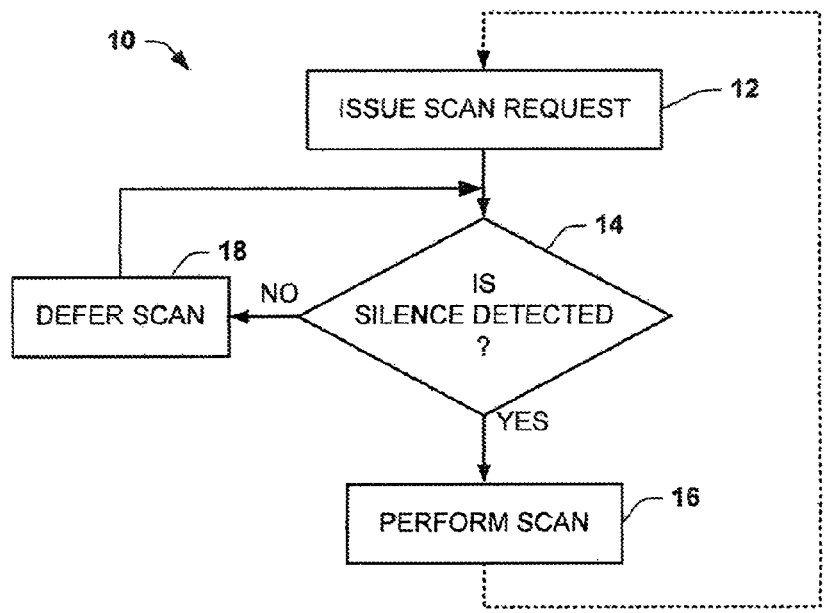
FIG. 1 is a flow diagram depicting a method in accordance with an aspect of the invention.

The invention relates generally to a system and method to control scanning from a wireless device, such as can be utilized to mitigate degradation of voice audio during a voice over internet protocol (VoIP) session. The invention facilitates mitigates degradation of voice audio by deferring or delaying a scan based on the presence or absence of audio (e.g., voice) or other streaming media being transmitted from the mobile unit.

As will be appreciated by those skilled in the art, portions of the invention may be embodied as a method, data processing system, or computer program product. Accordingly, these portions of the present invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments of the invention are described herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The invention relates to a system and method to control scanning for a mobile unit. In certain embodiments, the mobile unit can be configured to perform handover between different radio technologies, which can be controlled based at least in part on the results of the scanning. As used herein, the term "radio technology" and variations of this term are intended to encompass any form of wireless communication that may be utilized to send, to receive or to send and receive audio signals (including voice signals), data signals or a combination of voice and data signals without requiring a hard-wired connection. Examples of different radio technologies include cellular telephones (e.g., 2G, 3G or 4G Global System for Mobile (GSM) technologies), personal communication system (PCS) communication technologies, wireless networks, (e.g., wireless local area networks (WLAN), such as WiFi; wireless metropolitan area networks (Wireless-MAN), such as WiMax; and any variation and improvements thereof), satellites, Bluetooth, two-way (or half-duplex) radio, and any combinations thereof. Those skilled in the art will understand and appreciate that various standards and protocols exist and have yet to be developed to enable communication via these and other radio technologies. For example, the mobile unit can be implemented in any form of wireless technology, such as including a cellular telephone, personal digital assistant (PDA), a portable computer (e.g., a laptop computer, or tablet computer) and the like.

FIG. 1 depicts an example of a method 10 that can be utilized to control scanning according to an aspect of the invention. The mobile unit may be a dual- or multi-mode device that is configured to perform real time voice communication over more than one type of radio technology, such as cellular and a wireless local area network (WLAN). Therefore, in order to control roaming from one wireless network to a different wireless network, the mobile unit includes high-level mobility control application programmed to initiate scanning to locate available access points or base stations to facilitate handover that may be needed. It will be appreciated that, in the absence of the present invention, such scanning can result reduction in overall throughput. The reduced throughput can manifest itself as gaps since the mobile unit is not able to send or receive application traffic over a given wireless link during scanning over the wireless link. This can have a significant impact for streaming applications, such as VoIP, as such gaps can significantly degrade the quality of the real time audio communication.

The method 10 of FIG. 1 is designed to control scanning for a given radio technology in a way that synchronizes scanning with periods of detected silence in the real time audio (e.g., voice), such as during a VoIP session over the given radio technology. As mentioned, the mobile unit can be programmed to periodically or intermittently issue a scan request, indicated at 12, for performing a scan. For instance, periodic scan request issued at 12 can be required by a higher level application running on the mobile unit to control the handover and roaming operations for the mobile unit. The scan request can correspond to a request for an active or passive scan depending on the configuration for the mobile unit. For example, the scanning can be performed according to the IEEE 802.11 protocol. This scanning performed in response to the scan request 12 issued in the method 10 can be in addition to the background scanning performed by the lower physical layer of the protocol for the respective radio technology. That is, the IEEE 802.11 protocol runs substantially transparently to the method 10, which can issue additional scanning requests, such as for the purpose of controlling handover. For example, a dual- or multi-mode mobile unit can employ such scanning control method 10 to facilitate handover between radio technologies (e.g., from an 802.11 VoIP call to call over a 3G or 4G cellular network). One example of systems and methods that can be implemented to control handover for a mobile unit are shown and described in U.S. patent application Ser. No. 11/778,831, which was filed on Jul. 17, 2007, and entitled SYSTEM AND METHOD TO FACILITATE HANDOVER.

It will be appreciated that the invention is not limited to use of scanning control utilized in conjunction with performing handover between different radio technologies. The scanning control can be further utilized in conjunction with scanning that can be performed for a variety of reasons. As an example, for a device implementing the IEEE 802.11 protocol (or a similar protocol, such as WiMAN), scanning can be utilized for network discovery, synchronization, to discover neighboring APs, to obtain neighbor AP RSSI measurements, to perform AP to AP roaming as well as for link budget calculations to name a few. Each of these applications can leverage the scanning control described herein to help improve quality of a voice communications session.

At 14, a determination is made as to whether silence is detected. The silence can be detected in the absence of real time audio being input into the mobile unit (e.g., via a microphone) for transmission. Those skilled in the art will understand and appreciate various ways in which the mobile unit can be configured to detect whether a period of silence exists. For example, the mobile unit can include a voice activity detection (VAD) algorithm that is programmed to detect voice activity in the mobile unit, such as in response to audio received via a microphone. Such voice activity detector is often utilized in conjunction with silence suppression mechanisms, which may also be implemented in a mobile unit. Alternatively, the silence can be detected based on monitoring outgoing data packets. For example, a typical real-time streaming voice conversation over VoIP includes approximately fifty packets per second. Therefore, if the packet rate does not exceed a predetermined threshold, which is set to something less than fifty packets per second, a period of silence can be determined to exist. Those skilled in the art will understand and appreciate various types and implementations of a voice activity detection algorithm that can be utilized in implementing the scan control shown and described herein.

If silence is determined to exist at 14 (YES), the method proceeds to 16 in which the scan is performed. The scan can be performed at 16, such as by a requesting application providing the scan request through appropriate application program interface (API) associated with the wireless transceiver that is to perform the scan. The scan request further can include one or more parameters that define characteristics of the scan that is to be performed, such as including a maximum scan delay time or other scan parameter that can be defined via the API. As mentioned above, the scan being performed at 16 can be an active scan or a passive scan. After the scan is performed, the method can return (indicated as a dotted line) back to 12 for issuing a next scan request.

If the determination at 14 is negative, indicating that silence is not detected, the method can proceed to 18 in which the scan is deferred. The scan can be deferred until a period of silence is detected, such as by looping through 14 and 18. Alternatively or additionally, the deferral of the scan can be deferred up to a predetermined time period depending on application requirements. For instance, upon the predetermined time period expiring, the method 10 can advance from 14 to 18 for performing the scan regardless of whether silence is detected.

Figure 2:
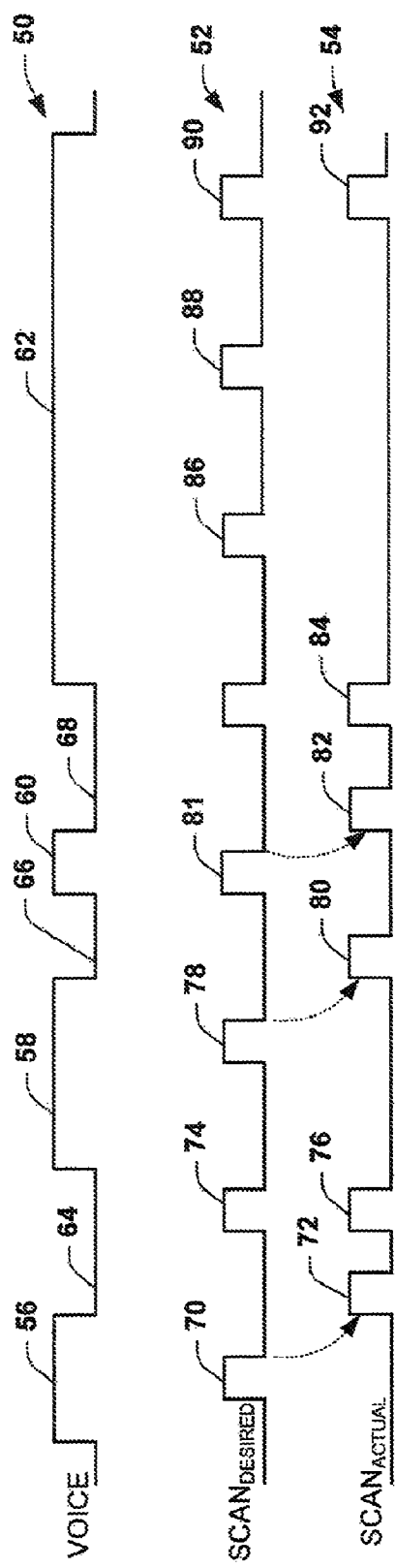
FIG. 2 depicts an example timing diagram illustrating a comparative example for the relationship between voice traffic and scanning that can be implemented according to an aspect of the invention.
Figure 3:
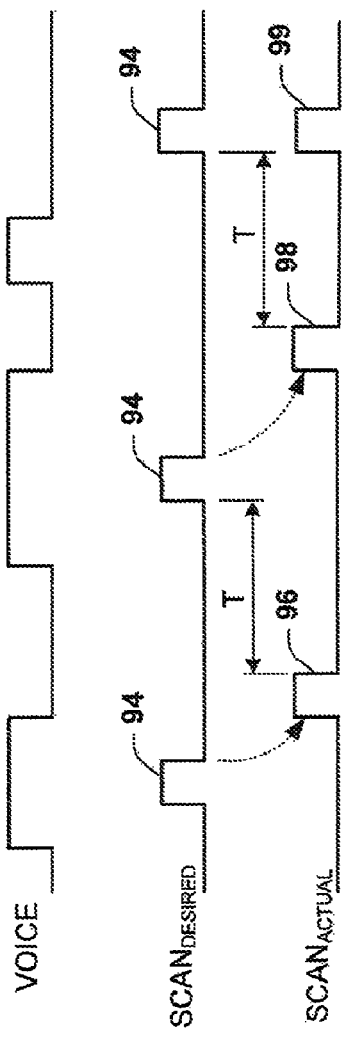
FIG. 3 depicts another example of a timing diagram illustrating a comparative example for the relationship between voice traffic and scanning that can be implemented according to an aspect of the invention.

The effects of the scan control will be better appreciated with reference to FIGS. 2 and 3. FIG. 2 depicts a timing diagram that illustrating voice activity 50 at a mobile unit, a desired periodic scan 52, and an actual scan that can be performed according to an aspect of the invention. In the voice activity 50, periods of voice are indicated as logic high signals, indicated at 56, 58, 60 and 62. Conversely, periods of silence are indicated at logic low signals indicated at 64, 66 and 68. The voice activity, for example, can be provided by voice activity detector implemented as computer executable instructions running within a processor of the mobile unit. As mentioned above, the periodic scan request 52 can be required by an application, such as a mobility manager running in the mobile unit. Such mobility manager can utilize the results of the scanning to control handover between different radio technologies for a multi-mode mobile unit.

In the example of FIG. 2, a first desired scan 70 is coincident with the voice activity 56. According to an aspect of the invention, the scan request 70 is delayed until a period of silence is detected indicated at 64. Thus, the desired scan request 70 is delayed for a period of time and results in an actual scan, indicated at 72. In contrast, the subsequent desired periodic scan 74 occurs during the period of silence 64 and therefore results in an actual scan, demonstrated at 76, without deferral. Thus, the relative timing between the actual scan 72 and 76 are closer together than the interval of the desired scans 70 and 74. A next desired periodic scan 78 is coincident with the voice activity indicated at 58. As a result, the periodic scan 78 is delayed until the period of silence occurs resulting in the actual scan indicated at 80, which occurs during the silence period 66. The time period between the actual scan 76 and the actual scan 80 is longer than the interval of the desired scan 52 due to the delay imposed on the periodic scan 78. Similar situations occur for scan 82 which is delayed to be synchronized with the silence period 68 whereas actual scan 84 occurs during the silence period 68 without delay. It will be appreciated that the timing requirements of the application for which the actual scanning 54 is performed may be relatively loose or relaxed, such that the benefits associated with the improved call quality exceeds the effects of delaying such scanning.

In the example of FIG. 2, the voice activity 62 spans a significant time period, which is greater than a duration of three desired scan periods. As a result, the desired scans 86 and 88 do not result in a scan being performed. However, a subsequent desired scan indicated at 90 is forced to occur despite it occurring during the period of voice activity 62. That is, in a situation where voice activity occurs for an extended period of time, such as may encompass two or more scan periods or other predetermined time period (e.g., about three seconds), a mobile unit implementing scan control according to an aspect of the present invention can time out the deferral and perform the scan request. This time out feature can be implemented to ensure appropriate access points are located to enable handover to occur more smoothly. The amount of time or number of scan periods that can be utilized to implement the time out feature can vary depending, for example, on the size of the wireless network, where the mobile unit may be located at the time of its previous scan or other parameters that may be programmable by a user, such as a network administrator.

While the example in FIG. 2 depicts the desired scan period 52 remaining a fixed period, it is to be understood and appreciated that other scanning intervals could be utilized. For example, a timer could be implemented such that each next desired scan is set to occur a predetermined length of time from a proceeding actual scan. An example of this is depicted in FIG. 3 in which each desired scan 94 occurs a substantially fixed time period (T) from the occurrence of a respective preceding actual scan. The fixed time period further may be programmable. The actual scanning performed in the approach depicted in FIG. 3 occurs depending on whether silence is detected, similar to as discussed in FIG. 2. Thus, each of the scans, indicated at 96 and 98 is deferred until silence is detected whereas the actual scan 99 occurs without deferral.

Figure 4:
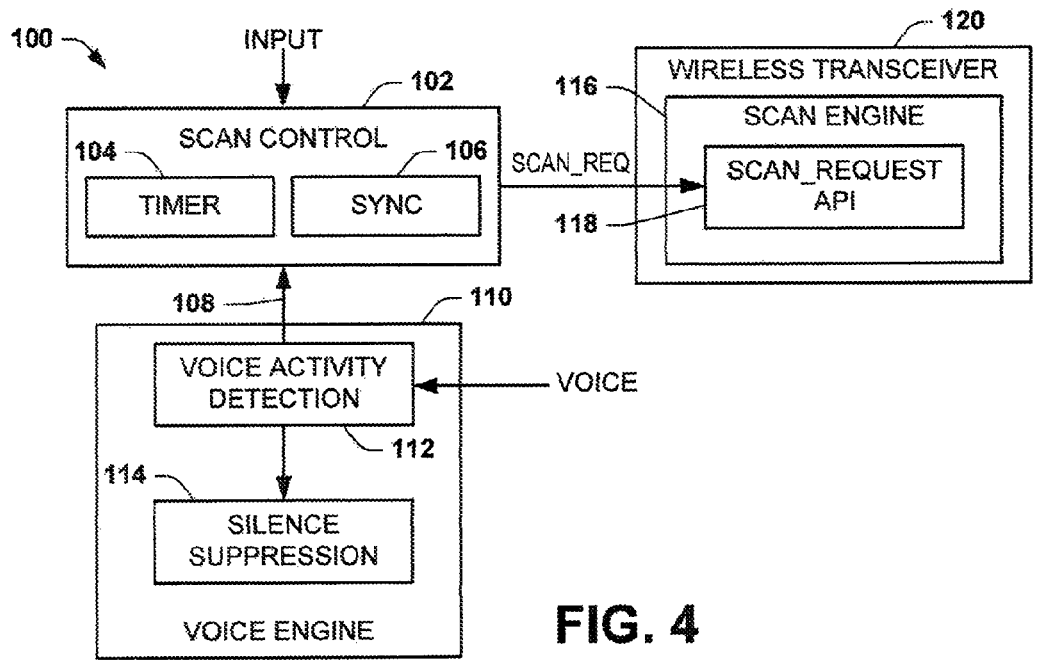
FIG. 4 depicts an example of a system that can be implemented to control scanning according to an aspect of the invention.

FIG. 4 depicts an example of a scanning system 100 that can be implemented according to an aspect of the invention. The scanning system 100 can be implemented as a hardware and/or software implemented in a mobile unit. The scanning system 100 includes a scan control function 102 that is programmed and/or configured to control scanning. For example, a mobility application running in the mobile unit can employ the scanning system 100 during a call session to identify available access points or base stations for the purpose of controlling handoff between different radio technologies. The scan control system 100, for example, can include a timer 104 that can be utilized to control timing when desired scan requests are issued by the scan control component. For instance, the timer 104 can provide a scanning interval in a range from approximately every second to every two seconds. Alternatively, the scan control component 102 can be invoked to issue a scan request in response to an INPUT from one or more other applications running in the mobile unit. In such an example, the timer 104 can be implemented as part of such other applications to control periodic or intermittent requests for scanning to be performed.

The scan control 102 also can include a synchronization component 106. The synchronization component 106 is utilized to synchronize the periodic scan request with periods of silence, corresponding to the absence of voice being transmitted from the mobile unit. The synchronization component 106 thus can perform such synchronization based upon a state of a voice indication signal 108 provided by a voice engine 110. For example, the voice engine 110 can be programmed or configured to perform processing of the input voice received at the mobile unit, such as via one or more microphones or other audio input devices. The voice engine 110 further can include a voice activity detection (VAD) component 112 that is programmed to provide the voice activity indication signal 108 depending on the presence or absence of voice audio being detected.

By way of further example, the VAD component 112 employs a VAD algorithm to extract some measured features or quantities from the input signal and to compare these values with thresholds, usually extracted from the characteristics of the noise and speech signals. The VAD component 112 decides if active voice is detected based on whether the measured values exceed the thresholds. The threshold may be fixed or may be a time-varying threshold value, such as can be calculated in the voice-inactive segments. Those skilled in the art will appreciate different measures that can be used in VAD methods, including spectral slope, correlation coefficients, log likelihood ratio, cepstral, weighted cepstral, and modified distance measures. The voice activity detection component 112 may further provide the voice activity signal to a silence suppression component 114.

The silence suppression component 114 can be utilized to generate comfort or background noise during the period of silence. For example, when silence suppression is applied in networks transmitting voice over packets (e.g., voice over internet protocol (VoIP) networks, or voice over asynchronous transfer mode (VoATM) networks), no packets are transmitted during periods of silence. The silence suppression component 114 thus can determine whether or not to transmit packets during periods of detected silence for performing silence suppression.

The synchronization component 106 can delay or defer scan requests to be coincident with periods of silence, such as indicated by the voice activity indication signal 108. The scan control component 102 provides the scan control request to a scan engine 116. For example, the scan control 102 can provide the scan control request to the scan engine 116 via a SCAN_REQUEST application program interface (API) 118 provided by the operating system that is implemented in the mobile unit. The SCAN_REQUEST API 118 may differ depending on the operating systems running in the mobile unit. The scan engine 116 is programmed to control the scanning procedure for an associated wireless transceiver 120. The scan control request can also include one or more parameters or fields defining parameters for carrying out the scan request, such as may control timing of the request, set a maximum delay, specify one or more channels to be scanned, and the like.

By way of further example, for an active scan procedure implemented according to an 802.11x standard, the scan engine 116 can control the wireless transceiver 120 to perform an active scan of available channels (e.g., 11 channels in the 2.4 Ghz U.S. band), such as by sending one or more 802.11 Probe Request frames for each channel. The scan may be performed for any number of reasons, such as described herein. The scan engine of the wireless transceiver 120 waits for responses to each request. The amount of time to wait on each channel may vary from device to device, such as typically ranging from about 30 ms to about 60 ms. Accordingly, the entire scan sequence may result in an overall delay ranging from about 300 ms to about 700 ms. The scan control component 102 can repeat the process and issue additional scan requests to the scan engine 116 according to application requirements, which may be periodic or otherwise.

Figure 5:
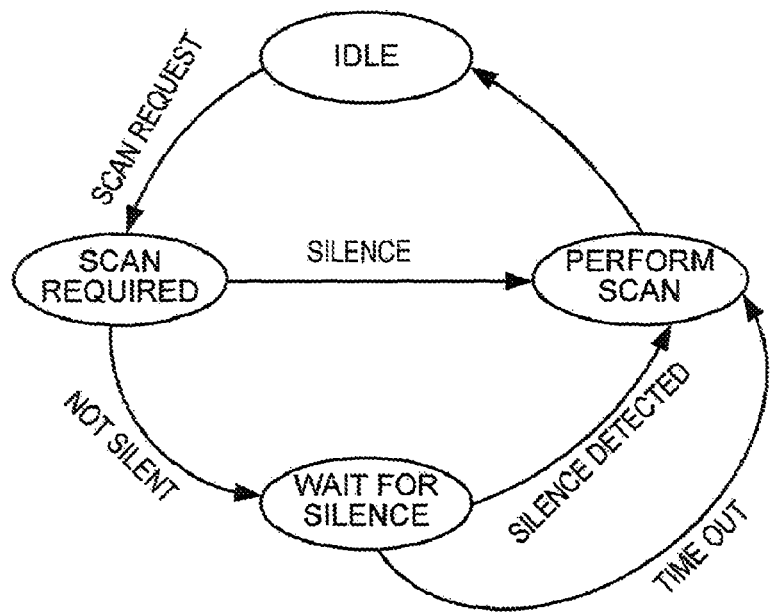
FIG. 5 depicts an example of a state diagram for states that can be implemented to control scanning according to an aspect of the invention.

FIG. 5 depicts an example of a simplified state machine that can be implemented by the scan control 102 (FIG. 4) for synchronizing scan requests according to an aspect of the invention. The scan control 102 (FIG. 4) can first operate in an IDLE state in which no scanning is being performed. At times when a scan is to be performed, a scan request can be issued by the scan control system indicating that a scan is required, such that the state machine transitions to a SCAN REQUIRED state. If a period of silence is detected coincident with the request, the state machine can transition to a PERFORM SCAN state for performing the scan. When silence is not present while in the SCAN REQUIRED state, the state machine transitions to a WAIT FOR SILENCE state in which it can remain until a period of silence is detected. When silence is detected, the state machine can transition from the WAIT FOR SILENCE state to the PERFORM SCAN state in which a scan is performed. Because it may not be desirable to wait indefinitely for performing the scan especially in situations in which a mobile unit may need to handoff communication from a first radio technology (e.g., WLAN) to a second radio technology (e.g., cellular), a timer may be implemented to set a maximum time that the state machine will remain in the WAIT FOR SILENCE state. Thus, if a maximum time has elapsed (corresponding to a time out), the state machine can transition from the WAIT FOR SILENCE state to the PERFORM SCAN state. After the scan is performed, the state machine can return to the IDLE state.

Figure 6:
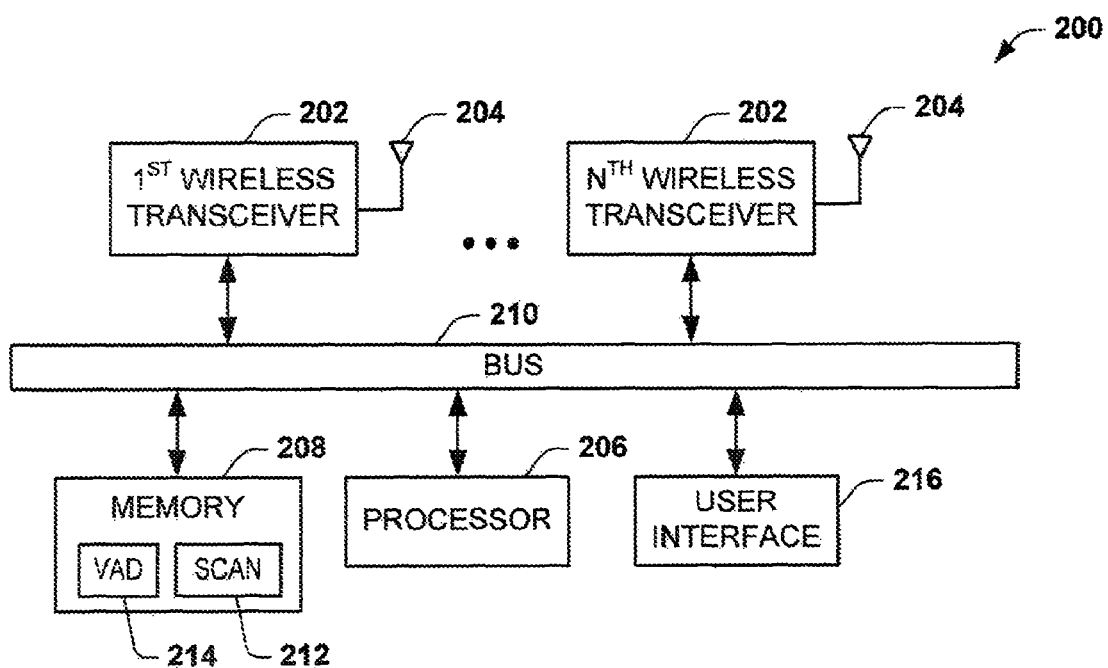
FIG. 6 depicts an example of a mobile unit that can be implemented according to an aspect of the invention.

FIG. 6 depicts an example of a mobile unit 200 that can be implemented according to an aspect of the invention. The mobile unit 200 includes one or more wireless transceivers 202, which are indicated as a first wireless transceiver and Nth wireless transceiver, where N is a positive integer denoting the number of one or more wireless transceivers. Each of the wireless transceivers 202 is operative to send and receive wireless signals via corresponding antennas 204. For receiving signals, each wireless transceiver 202 includes circuitry for demodulating and converting the received signals to an appropriate digital format for processing at the receiver as is known in the art. Each transceiver 202 may also include circuitry for converting data being provided from the mobile unit and from modulating and performing frequency conversion of such data and for sending such data out via the antenna 204. Additionally, at least one of the wireless transceivers is configured to transceiver voice using VoIP, such as using the first wireless transceiver. Thus, the mobile unit 200 is configured to communicate over two different types of radio technologies operating according to respective wireless protocols. For example, the mobile unit 200 can communicate in a wireless network (e.g., WiFi Network or WiMax Network) using the first wireless transceiver. The second wireless transceiver can correspond to a cellular transceiver configured to communicate in an appropriate cellular network. While the example mobile unit 200 is depicted as a multi-mode unit, it will be appreciated that the scanning control can apply to a mobile unit having any number of one or more wireless transceivers. For instance, the scanning control method and system can be implemented by a single mode mobile unit (e.g., a single mode 802.11 VoIP telephone).

The mobile unit 200 can be portable and thus can be carried or otherwise transported in space, such as by a user. The mobile unit 200 also includes a processor 206 that is programmed and configured to control operation of the mobile unit based upon executable instructions stored in associated memory 208. The memory can include random access memory (RAM), read only memory (ROM), flash memory, or other type of memory device. The processor 206 can communicate with each of the transceivers 202 via a bus 210. The processor 206 can also retrieve and store data and instructions relative to the memory 208 over the bus. Alternatively or additionally, the processor 206 may include cache or access other associated memory (not shown) directly.

According to one embodiment, the processor can execute instructions corresponding to scan control. Such scan control can be implemented as a process or a routine that is stored in the memory, indicated at 212. The scan control 212 thus can be executed by the processor 206, such as part of a mobility control for implementing a handover between wireless technologies. Thus, the mobility manager (or one or more other application) may periodically invoke or call the scan control 212 to issue a scan request. The scan control 102 can synchronize the scan with a periods of silence (e.g., corresponding to the absence of voice traffic being transmitted from the mobile unit 200) such as shown and described herein. For example, additional executable instructions can be stored in the memory for detecting voice activity, such as a VAD algorithm 214 implemented as part of a voice engine. Thus, the scan request can be synchronized with periods of silence and thereby improve phone quality by avoiding potential degradation that would occur by implementing a scan during periods of voice activity.

The mobile unit 200 may also include a user interface 216 that can be employed by a user for interacting with the mobile unit 200. The user interface 216 can include an arrangement of graphical interface elements as well as buttons and other controls (e.g., knobs, dials and touch screen controls and the like) for implementing the various functions of the mobile unit 200.

In view of the foregoing, it will be appreciated that the methods and systems described provides a means to control scanning for a respective radio technology. This is accomplished by controlling scans to occur synchronized with periods of silence. For example, the scanning can be required for purposes of enabling handover during a call session, such as from WLAN to cellular as well as from cellular to WLAN. Thus, the synchronized scanning helps mitigate degradation in overall voice quality that might otherwise occur when the scanning is performed.

What have been described above are examples and embodiments of the invention. It is, of course, not possible to describe every conceivable combination of components or methodologies for purposes of describing the invention, but one of ordinary skill in the art will recognize that many further combinations and permutations of the present invention are possible. Accordingly, the invention is intended to embrace all such alterations, modifications and variations that fall within the scope of the appended claims. In the claims, unless otherwise indicated, the article "a" is to refer to "one or more than one."

What is claimed is:

1. A method to control scanning performed by a mobile unit, the method comprising:
    detecting a presence or absence of voice audio for transmission from the mobile unit;
    following a request to initiate a scan, deferring initiation of performance of the scan for up to a predetermined time period while detecting a substantially continuous presence of the voice audio;
    in response to detecting the absence of the voice audio for transmission from the mobile unit during the deferring and prior to expiration of the predetermined time period, initiating performance of the scan; and
    initiating the performance of the scan in response to expiration of the predetermined time period during the substantially continuous presence of the voice audio.

2. The method of claim 1, wherein the voice audio comprises voice audio input into the mobile unit for transmission, the detecting further comprising monitoring the voice audio by a voice activity detector and providing a voice activity indication signal indicating the presence of the voice audio, the initiation of the performance of the scanning being deferred in response to the voice activity indication signal.

3. The method of claim 2, wherein the initiation of the performance of the scanning is deferred for up to the predetermined time period in response to the voice activity indication signal indicating the substantially continuous presence of the voice audio input.

4. The method of claim 1, wherein the predetermined time period is programmable.

5. The method of claim 1, further comprising:
    periodically issuing a scan request during a call session to initiate the performance of the scan; and
    employing results of the performance of the scanning to control handover from a first radio technology to a second radio technology, which is different from the first radio technology, implemented by the mobile unit.

6. The method of claim 5, wherein the scan request is provided to initiate the performance of the scan according to communications protocol implemented in the first radio technology.

7. The method of claim 5, wherein the call session comprises a voice over internet protocol call session.

8. The method of claim 5, wherein the first radio technology comprises one of wireless local area network (WLAN) technology and a wireless metropolitan area network (WMAN) technology, and the second radio technology comprises one of a global system for mobile (GSM) wireless communication technology and a personal communication system (PCS) wireless communication technology.

9. A system to control scanning by a mobile unit, comprising:
    a wireless transceiver of the mobile unit, the wireless transceiver comprising a scan engine;
    a scan control component programmed to provide a scan control request to the scan engine for initiating a scan by the wireless transceiver that is synchronized with periods of voice silence during a call session of the mobile unit via an application program interface of an operating system of the mobile unit.

10. The system of claim 9, further comprising a voice activity detector programmed to monitor outgoing audio from the mobile unit and to detect the periods of voice silence in the outgoing audio during the call session, the voice activity detector providing a voice activity indication signal indicating a presence or an absence of voice audio during the call session.

11. The system of claim 10, wherein the scan control component further comprises a synchronization component programmed to synchronize the scanning responsive to the voice activity indication signal such that the scan control component provides the scan control request to initiate scanning by the wireless transceiver during the periods of voice silence.

12. The system of claim 9, wherein the wireless transceiver comprises at least a first wireless transceiver that employs a first radio technology and a second wireless transceiver that employs a second radio technology, the system further comprising a mobility manager programmed to issue the scan control request and to control roaming between the first radio technology and the second radio technology based on results from the scanning.

13. The system of claim 12, wherein the first radio technology comprises one of wireless local area network (WLAN) technology and a wireless metropolitan area network (WMAN) technology, and the second radio technology comprises one of a global system for mobile (GSM) wireless communication technology and a personal communication system (PCS) wireless communication technology.

14. The system of claim 9, further comprising a timing component configured to defer the scan control request from the scan control component scanning for up to a predetermined time period in response to detection of a substantially continuous presence of voice audio during the call session.

15. A mobile unit comprising:
    a first wireless transceiver configured to communicate using a first radio technology;
    a second wireless transceiver configured to communicate using a second radio technology, which is different from the first radio technology;
    a scan control component programmed to determine periods of voice silence corresponding to a lack of outgoing voice audio in a communication signal from the mobile unit based on a comparison of at least one extracted feature associated with the communication signal relative to at least one threshold, and to synchronize scanning performed by the first wireless transceiver with the periods of voice silence during a call session implemented by the mobile unit.

16. The mobile unit of claim 15, further comprising a timing component configured to defer scanning performed by the first wireless transceiver for up to a predetermined length of time in response to detecting a substantially continuous presence of voice audio being input for transmission from the first wireless transceiver the during the call session.

17. The mobile unit of claim 15, further comprising a mobility manager programmed to control handover from the first radio technology to the second radio technology based at least in part on the scanning performed by the first wireless transceiver.

18. The mobile unit of claim 15, wherein the at least one extracted feature associated with the communication signal comprises an outgoing voice packet rate, and wherein the at least one threshold comprises a outgoing voice packet threshold, the scan control component being programmed to determine a period of voice silence based on the outgoing voice packet rate being less than the outgoing voice packet threshold.

* * * * *